United States Patent [19]

Raad

[11] Patent Number: 4,982,123
[45] Date of Patent: Jan. 1, 1991

[54] INTEGRATED EXCITER GENERATOR AND ROTATING TRANSFORMER

[75] Inventor: Bernard A. Raad, Fair Haven, N.J.

[73] Assignee: Sunstrand Corporation, Rockford, Ill.

[21] Appl. No.: 437,739

[22] Filed: Nov. 17, 1989

[51] Int. Cl.$^5$ .................. H02K 3/18; H02P 9/14; F02N 11/04
[52] U.S. Cl. .................... 310/68 D; 290/46; 318/158
[58] Field of Search ............ 290/38 R, 46; 310/68 D, 310/113, 158, 198; 322/10; 336/120, 122, 123; 318/158

[56] References Cited

U.S. PATENT DOCUMENTS

| | | |
|---|---|---|
| 2,500,802 | 3/1950 | Clark . |
| 2,540,202 | 2/1951 | Haas . |
| 3,512,026 | 5/1970 | Tiltins . |
| 3,614,593 | 10/1971 | Lace . |
| 3,702,964 | 11/1972 | Kudlacik et al. . |
| 3,702,965 | 11/1972 | Drexler et al. ............ 310/68 D |
| 3,908,161 | 9/1975 | Messenger .............. 290/38 |
| 4,093,869 | 6/1978 | Hoffmann et al. .......... 290/31 |
| 4,210,836 | 7/1980 | Kouba . |
| 4,401,939 | 8/1983 | Korbell . |
| 4,682,068 | 7/1987 | Cotzas et al. ............ 310/198 |
| 4,743,777 | 5/1988 | Shilling et al. ........... 290/46 |
| 4,939,441 | 7/1990 | Dhyanchand ............ 318/158 |

Primary Examiner—Steven L. Stephan
Assistant Examiner—D. L. Rebsch
Attorney, Agent, or Firm—Wood, Phillips, Mason, Recktenwald & VanSanten

[57] ABSTRACT

The problem of providing field power to a stationary main generator rotor is addressed such that it can be used as a synchronous or brushless dc motor. To that end, a dynamoelectric machine performs the dual-functions of an exciter generator and a rotating transformer integrated into a single unit (14). The heads (64) of the stator salient poles (60) include pole slots (68) for a primary transformer winding (34) for the rotating transformer, while the rotating armature winding (36) serves as the transformer secondary. To assist in starting the engine (10), external ac power (42) is applied to the primary transformer windings (34), coupled to armature windings (36), and rectified (44) to develop dc field power for the main generator (12).

9 Claims, 2 Drawing Sheets

INTEGRATED EXCITER GENERATOR AND ROTATING TRANSFORMER

FIELD OF THE INVENTION

The present invention generally relates to electrical power systems. More particularly, the present invention is directed to an improved method and apparatus for starting aircraft engines using a main generator functioning as a motor, and using an exciter generator functioning as a rotating transformer.

BACKGROUND OF THE INVENTION

A typical aircraft synchronous generator includes a permanent magnet generator (PMG), an exciter generator, and a main generator, all on a common shaft which is driven by the aircraft engine. The PMG is used in connection with a voltage rectifier and regulator for developing field power to the exciter. Next, the exciter generates three-phase alternating current (ac) power, which is then rectified and applied as the direct current (dc) field power for the main generator. Finally, the main generator develops the three-phase AC output power for the aircraft.

A major concern in the aircraft industry is to find an efficient method for starting turbine engines. Various systems have used the main generator configured as a motor to drive and start the engine. In order to operate the main generator as a synchronous or brushless DC motor, it is necessary to apply dc power to the main generator field winding. However, since in a typical dynamoelectric machine of this type the main field winding is part of the rotating member, some means must be devised to transfer excitation power to the rotor, from the easily accessible stator. The approach of using a slip-ring configuration is not desirable, due to brush wear and carbon dust considerations. Furthermore, a conventional exciter generator cannot be used in this application, since the dc field power must be initially supplied when the engine is not running, and a conventional exciter cannot develop power if its rotor is not rotating.

It is possible, however, to utilize a rotary transformer, having its secondary winding placed on the common shaft, to couple externally-generated power to the main generator field winding, even while the machine is at a standstill. A rotating transformer would utilize, high-frequency ac power, supplied by an external ac-to-ac converter, to energize its stationary primary winding, which would induce an ac current in its secondary winding. This ac-coupled power could then be rectified to provide the dc field power to the immobilized main generator rotor. Such a rotating transformer configuration would require the use of an additional device in the power system coupled to the common shaft. The use of an additional rotating transformer device for starting the engines would not only increase the weight of the aircraft, but also occupy valuable space.

Another approach was taken in U.S. Pat. No. 4,743,777, wherein a multiple-phase field winding was included with the dc field winding in the stator slots of an exciter. Such a construction, however, exhibits substantial pole-to-pole flux leakage between adjacent slots which create the magnetic poles. When using the dc field winding in its exciter generator mode, this flux loss tends to significantly degrade the efficiency of the exciter.

A need, therefore, exists to provide an improved engine starting technique which addresses both the size and weight considerations, as well as the efficiency requirements.

SUMMARY OF THE INVENTION

Accordingly, a general object of the present invention is to provide an improved method and apparatus for starting aircraft engines, which would overcome the problems associated with prior art devices.

A further object of the present invention is to provide an integrated exciter generator and rotating transformer device to develop dc field power for the main generator whether or not the machine is running.

These and other objects are achieved by the present invention, which, briefly described, is an improved exciter generator apparatus for an electrical power system which uses the main generator as a motor to start the engine. The integrated exciter generator and rotary transformer includes a rotating armature having a three-phase ac armature winding embedded in slots in the rotor face, and a stator core surrounding the rotor and having a plurality of inwardly directed salient poles. In the preferred embodiment, the poles are T-shaped such that the lower root supports an upper head having slots in the pole face opposite the slots in the rotor face. The pole slots in the stator are shaped to receive a balanced three-phase ac winding, which is used as the primary transformer winding when the apparatus functions as a static and rotating transformer. A DC field winding is provided around the root of the stator poles, and is used for exciting the armature winding when the unit is running.

In the starting mode of operation, i.e., when the engine is not running, the exciter primary transformer winding is connected to an external source of three-phase ac power through a switching mechanism. The exciter then, operates as a rotary transformer to induce three-phase ac power into the armature winding which functions as the transformer secondary. This induced ac power is then rectified to provide the dc field power for the main generator. The three-phase ac armature winding of the main generator is similarly connected through a switching mechanism to an external source of ac power, such that the main generator functions as a motor to drive the shaft and start the engine.

In the generating mode of operation, i.e., when the engine is running, the external ac power source is removed from the system, and the exciter dc field winding is connected to a source of dc power, such as the voltage-regulated output of its permanent magnet generator, so as to develop field power for the exciter Since the exciter armature winding is now rotating, three-phase ac power is generated by the exciter, rectified by a diode bridge, and applied to the dc field winding of the main generator. Thus, the main generator, now driven by the engine, develops three-phase ac output power for the aircraft loads.

The integrated exciter generator and rotating transformer apparatus of the present invention advantageously provides dc power to the main generator field winding whether or not the engine is running. Moreover, the technique of integrating the rotating transformer with the exciter generator into one unit minimizes the size and weight requirements necessary to accomplish both functions, each providing a substantial advantage in aeronautical applications. Furthermore, the use of additional brushes or slip-rings is avoided.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like-reference numerals identify like elements, and in which:

DETAILED DESCRIPTION OF THE PREFERRED EMBODIMENT

Figure 1:
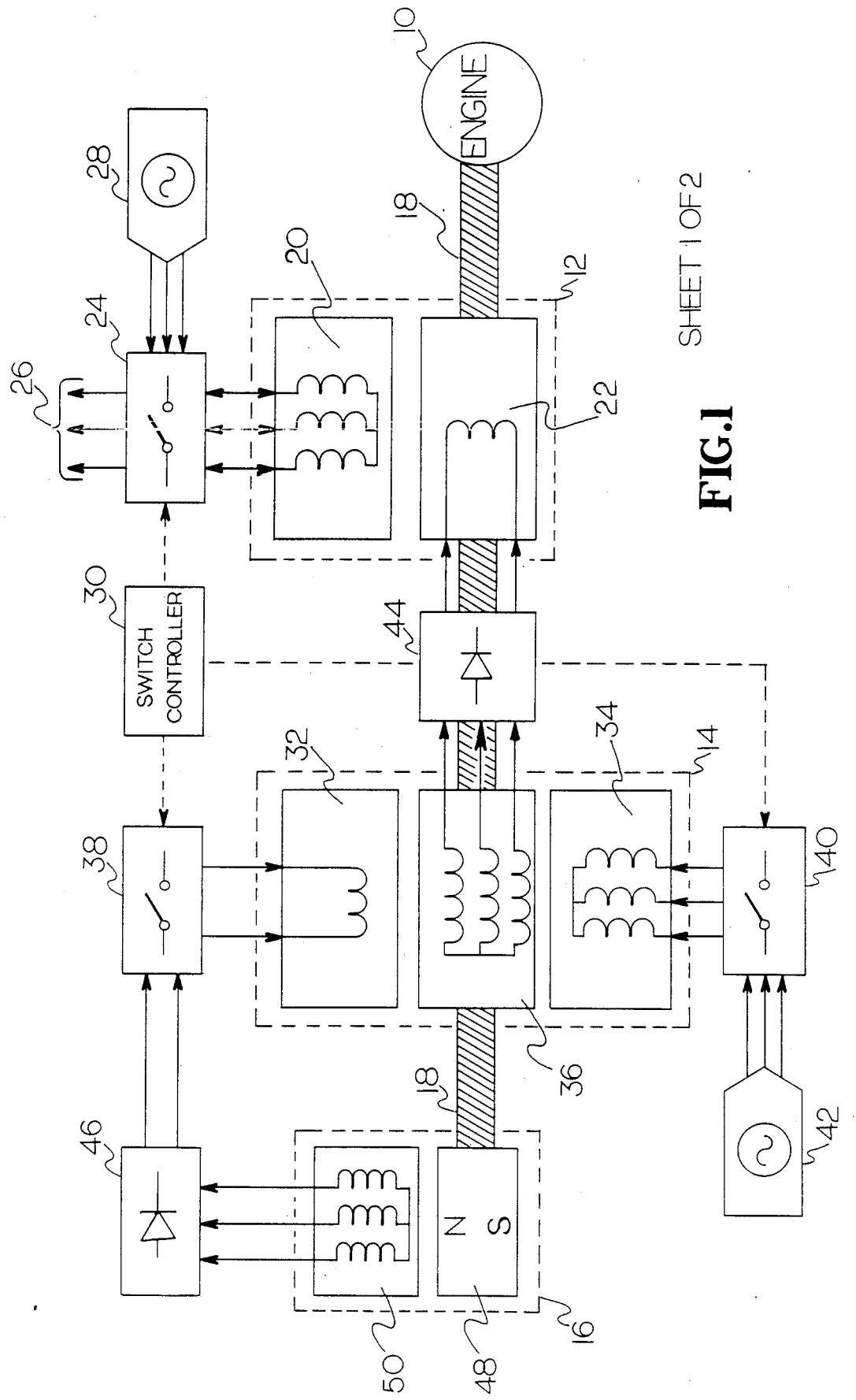
FIG. 1 is a general block diagram of an electrical power system utilizing the integrated exciter generator and rotating transformer technique in accordance with the present invention.

Referring now to FIG. 1, there is shown a general block diagram of an electrical power system incorporating the present invention. The system generally includes an engine 10, a main generator 12, an exciter generator 14, a permanent magnet generator 16, and their associated components. The power generating system is used in a first mode, herein called the starting mode, wherein the main generator 12 is operated as a motor and is used to start the engine 10, and in a second mode, herein called the generating mode, wherein the engine 10 drives the main generator 12 such that it develops ac power.

In a typical application, the engine 10 is a turbine engine of an aircraft. When the engine is running, it turns a rotor shaft 18, which is connected to the main generator 12, the exciter generator 14, and the PMG 16, and typically is common to all three generators. The starting of the engine 10 can be assisted by using the main generator 12 operating as a brushless synchronous motor or a brushless dc motor such that rotation of the shaft 18 drives the engine 10.

The main generator 12 includes a polyphase ac stator winding 20 and a rotating dc field winding 22. In the present embodiment, the stator windings are three-phase ac and are connected in a wye (Y) configuration to produce a three-phase ac voltage. As in conventional brushless power systems, rotation of the shaft 18, driven by the engine 10, results in the generation of a three-phase ac voltage in the stator windings 20 when the field winding 22 is energized with dc power. This polyphase ac voltage is routed through a switch or contactor 24 to provide external ac output power at the output bus 26 in the generating mode. Owing to the variation in engine speed, the frequency of the generated ac power is also variable. In many instances, this variable frequency power is converted to a constant frequency power using a variable speed constant frequency (VSCF) converter to generate, for example, 115/200 VAC power at 400 Hz. Such converters are often controlled by a generator-converter control unit (GCCU). In other applications, a constant speed drive (not shown) is interposed between the engine 10 and the shaft 18.

The switch or contactor 24 serves to remove the connections to the output bus 26 and to connect an external ac power source 28, such as a ground cart, to the stator windings 20 at the direction of a switch controller 30. When the rotatable field winding 22 is energized, the main generator 12 is configured as a brushless synchronous motor or a brushless dc motor to drive the shaft 18. The motor function of the main generator 12 is then used to start the engine 10. Once the engine 10 is started, the switch controller 30 directs the switch 24 to remove the external AC power from the source 28, and to couple the generated output power to the output bus 26.

The exciter generator 14 a dc field winding 32 in the stator, a primary polyphase transformer winding 34 also in the stator, and a rotating polyphase armature winding 36 in the rotor. The armature winding also serves as a secondary transformer winding when used in the starting mode. These windings will be described in more detail in conjunction with FIG. 2.

In the starting mode, the switch controller 30 directs a switch 38 to disconnect the dc field winding 32 from the dc power source, typically the PMG 16. The switch controller 30 also directs a switch 40 to connect an external ac source 42 to the primary transformer winding 34. In the preferred embodiment, the ac source 42 provides highfrequency three-phase ac power from the same external source as ac power source 28. This external ac power is coupled via transformer action to the armature winding 36, serving as the transformer secondary. The induced ac power is then applied to a rectifier 44, typically a diode assembly, which provides dc power for the field winding 22 of the main generator. Hence, even at a standstill, the main generator field power is provided by the exciter generator 14 acting as a rotating transformer.

In the generating mode, the switch controller, 30 directs the switch 40 to disconnect the external ac source 42 from the stator transformer windings 34, and directs the switch 38 to couple dc power to the field winding 32, also in the stator. In the present embodiment, exciter field power is provided by the PMG 16 through a diode bridge rectifier assembly 46. When the shaft 18 rotates, permanent magnets 48 induce current in the polyphase windings 50, which is then rectified by the rectifier 46 to provide the dc field power for the exciter 14.

The switch controller 30 determines the occurrence and time durations of the starting mode and the generating mode. The controller may be implemented mechanically, e.g., utilizing a centrifugal switch, or electrically, e.g., using a signal from the GCCU. In either case, the switch controller 30 switches from the start mode to the generating mode after the engine has started.

Figure 2:
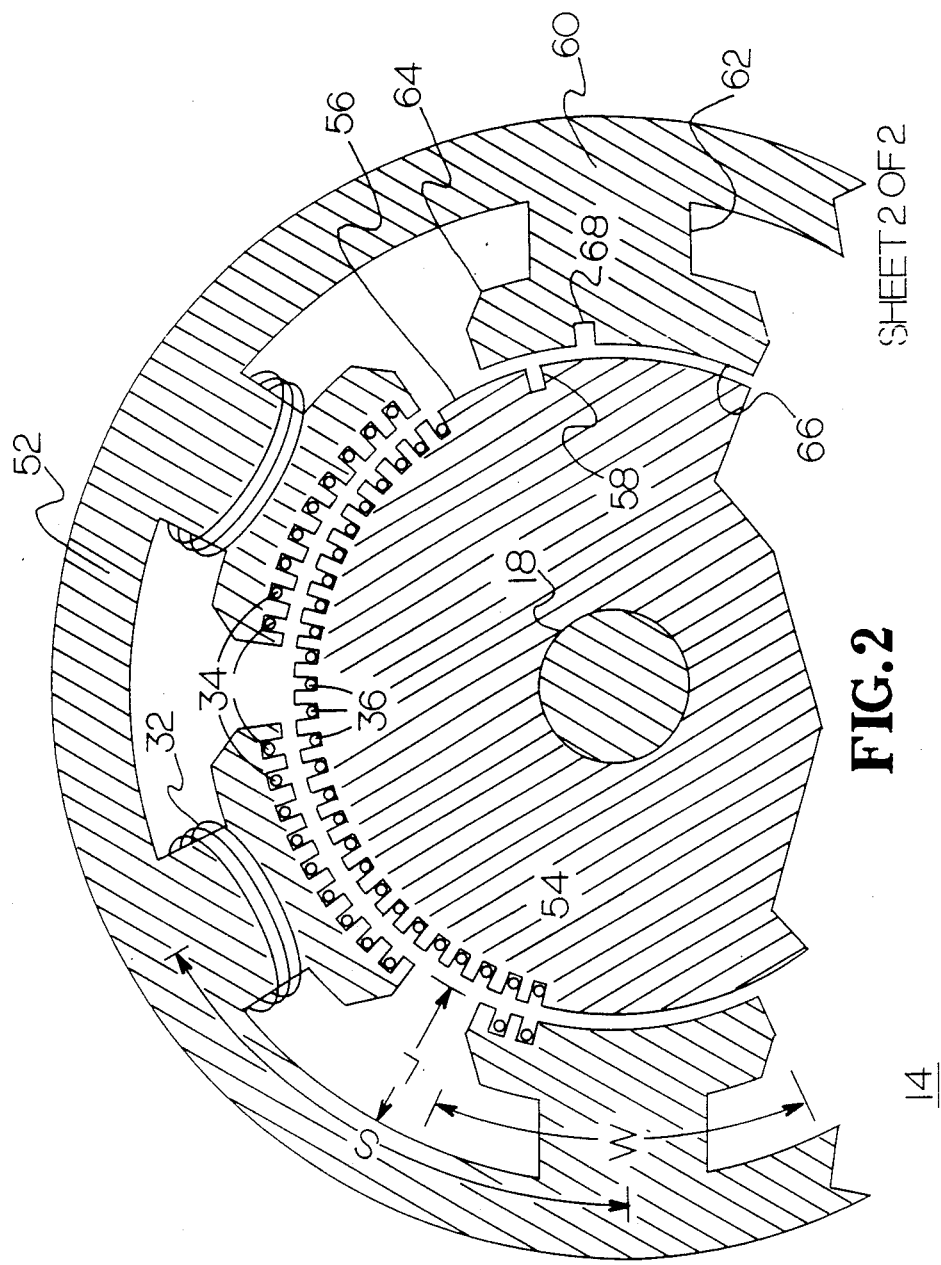
FIG. 2 is a partial cross-sectional view of the integrated exciter generator and rotating transformer of the present invention, illustrating the stator poles, rotor, and their associated windings.

Referring now to FIG. 2, a portion of the cross-sectional view of the integrated exciter generator and rotating transformer 14 is shown. This cross-section represents a lamination of the stator 52 and the rotor 54. The rotor 54, rotating with the shaft 18, has a rotor face 56 in which a plurality of winding slots 58 are located The three-phase ac armature winding 36 is embedded in the slots substantially as shown. Accordingly, the basic construction of the rotating armature is not changed from that of a conventional exciter.

However, the construction of the stator 52 and poles 60 thereof are unlike the conventional exciter generator. A plurality of salient pole pairs 60 are disposed around the inside portion of the stator core. Each pole is substantially T-shaped, having a lower root 62 and an upper head 64. The root 62 is projecting radially inward from and substantially perpendicular to, or on a radius of the stator core, such that the pole head 64 is substantially parallel to the face of the rotor. More particularly, the pole face 66 is disposed substantially parallel to and adjacent the rotor face 56 as shown.

The general shape of the poles 60 has been changed from that of a conventional exciter pole, in that a plurality of winding slots 68 have been added to receive the primary transformer winding 34. Note also that the overall radial length (L) of the pole has been increased due to the addition of these slots. The overall circumferential width (W) of the pole head has also increased for the same reason. Consequently, the separation distance (S) between poles, as measured at the stator core, has also been increased. The dc field winding 32 for the exciter generator is disposed around the root 62 of each pole.

The integrated exciter generator and rotating transformer of the preferred embodiment utilizes, a balanced three-phase ac armature winding to generate ac power in the generating mode. Utilizing this armature winding as the secondary winding of the rotating transformer, the primary transformer winding is also a three-phase ac winding. The preferred embodiment utilizes six (6) poles 60 evenly spaced around the inside circumference of the stator 52. Each pole head 64 has nine (9) slots 68, such that a total of fifty-four (54) slots are available for the primary transformer winding 34.

In review, it can now be appreciated that the present invention provides an exciter generator and a rotating transformer in a single integrated unit. The rotary transformer is used in a starting mode to transfer field power for the main generator, which is then used as a motor to start the engine Once the engine is started, the exciter generator is used to develop the main generator field power in the generating mode.

While specific embodiments of the present invention have been shown and described herein, further modifications and improvements may be made without departing from the invention in its broader aspects. For example, the integrated exciter generator and rotating transformer may be used in any type of power generating system, wherein power must be provided from a stationary rotor. Moreover, various pole shapes, slot configurations, pole numbers, slot numbers and windings may be used to achieve the same goal of constructing a dual-mode dynamoelectric machine. All such modifications which retain the basic underlying principles disclosed and claimed herein are within the scope of this invention.

What is claimed is:

1. A dynamoelectric machine comprising:
   rotor means for rotating about a shaft, said rotor means having armature winding means for providing electric power; and
   stator means for enclosing said rotor means, said stator means having a plurality of salient pole means for creating an electromagnetic field, each of said salient pole means projecting inwardly toward said rotor means, and having a slotted face disposed adjacent to the face of said rotor means, and having a base disposed between said pole face and said stator means, at least one of said pole means having both:
   (a) a field winding wound about said base for developing power in said armature winding means via generator action when said field winding is energized with direct current at least when said rotor means is rotating; and
   (b) a polyphase transformer winding wound in said slotted face for coupling polyphase power to said armature winding means via transformer action when said transformer winding is energized with polyphase alternating current at least when said rotor means is not rotating,
   whereby said armature winding means provides power when said rotor means is and is not rotating.

2. The dynamoelectric machine according to claim 1, wherein the face of said rotor means includes a plurality of slot means for embedding said armature winding means.

3. The dynamoelectric machine according to claim 1, wherein each of said salient pole means is T-shaped such that a narrow lower root portion of said pole means supports a wide upper head portion, and wherein the top of said head portion represents a face which is substantially parallel to the face of said rotor means.

4. The dynamoelectric machine according to claim 3 wherein said field winding is disposed around said root portion.

5. The dynamoelectric machine according to claim 1, wherein said armature winding means is a polyphase alternating current winding.

6. A dynamoelectric machine comprising:
   rotor means for rotating about a shaft, said rotor means having armature winding means for providing electric power; and
   stator means for enclosing said rotor means, said stator means having a plurality of salient pole means for creating an electromagnetic field, each of said salient pole means projecting inwardly toward said rotor means, wherein each of said salient pole means is T-shaped such that a narrow lower root portion of said pole means supports a wide upper head portion, and wherein the top of said head portion represents a slotted face which is substantially parallel to the face of said rotor means, at least one of said pole means having both:
   (a) a dc field winding, disposed around said root portion, for developing power in said armature winding via generator action when said field winding is energized with direct current at least when said rotor means i rotating; and
   (b) a polyphase transformer winding wound in said slotted face for coupling power to said armature winding means via transformer action when said transformer winding is energized with polyphase alternating current at least when said rotor means is not rotating,
   whereby said armature winding means provides power when said rotor means is and is not rotating.

7. The dynamoelectric machine according to claim 6 wherein he face of said rotor means includes a plurality of slot means for embedding said armature winding means.

8. The dynamoelectric machine according to claim 10, wherein said ac transformer winding is a three-phase alternating current winding.

9. The dynamoelectric machine according to claim 6, wherein said armature winding means is a three-phase alternating current winding.

* * * * *